United States Patent [19]
Hattori et al.

[11] Patent Number: 5,439,712
[45] Date of Patent: Aug. 8, 1995

[54] METHOD FOR MAKING A COMPOSITE ALUMINUM ARTICLE

[75] Inventors: Takeshi Hattori, Nishi; Kazuhiko Inogutt, Nagoya; Yukio Ohyama, Nishi; Yutaka Nakagishi, Ueno; Masaaki Sakaguchi, Osaka, all of Japan

[73] Assignees: Mitsubishi Jukogyo Kabushiki Kaisha, Tokyo; Okuno Chemical Industries Co., Ltd., Osaka, both of Japan

[21] Appl. No.: 203,406

[22] Filed: Mar. 1, 1994

Related U.S. Application Data

[63] Continuation of Ser. No. 922,469, Jul. 30, 1992.

[30] Foreign Application Priority Data

Aug. 19, 1991 [JP] Japan .................. 206706

[51] Int. Cl.⁶ ............................. B05D 1/18
[52] U.S. Cl. ................................. 427/437; 427/435; 427/436
[58] Field of Search ............ 427/436, 304, 435, 437; 428/408, 565, 908; 542/168, 99

[56] References Cited

U.S. PATENT DOCUMENTS

| | | | |
|---|---|---|---|
| 3,533,920 | 10/1970 | Covino et al. | 204/38 |
| 4,302,374 | 11/1981 | Helle et al. | 428/408 |
| 4,623,590 | 11/1986 | Hodes et al. | 260/29.6 F |

FOREIGN PATENT DOCUMENTS

| | | |
|---|---|---|
| 52-39059 | 9/1964 | Japan . |
| 51-1654 | 4/1966 | Japan . |
| 56-130489 | 6/1980 | Japan . |
| 3-229896 | 8/1991 | Japan . |

OTHER PUBLICATIONS

Patent Abstracts of Japan, vol. 13 No. 286 (C-613)(3634) 29 Jun. 1989 & JP-A-01 079 398 (Toyota Motor Corp).

Covino "Slippery, steel-hard coatings for metals" Machine Design, vol. 49, No. 19, 25 Aug. 1977, pp. 75-79.

*Primary Examiner*—Donald P. Walsh
*Assistant Examiner*—John N. Greaves
*Attorney, Agent, or Firm*—Nixon & Vanderhye

[57] ABSTRACT

A method for making a composite aluminum article comprises the steps of electrochemically or chemically adsorbing fine particles of a polytetrafluoroethylene to the surface of a hard anodic oxide film of an aluminum material or an aluminum alloy material, and drying the aluminum material or the aluminum alloy material. Thereafter, the aluminum material or the aluminum alloy material and an opposite member which slides along the aluminum material or the aluminum alloy material are rubbed together, and a lubricating film is thereby formed.

16 Claims, 1 Drawing Sheet

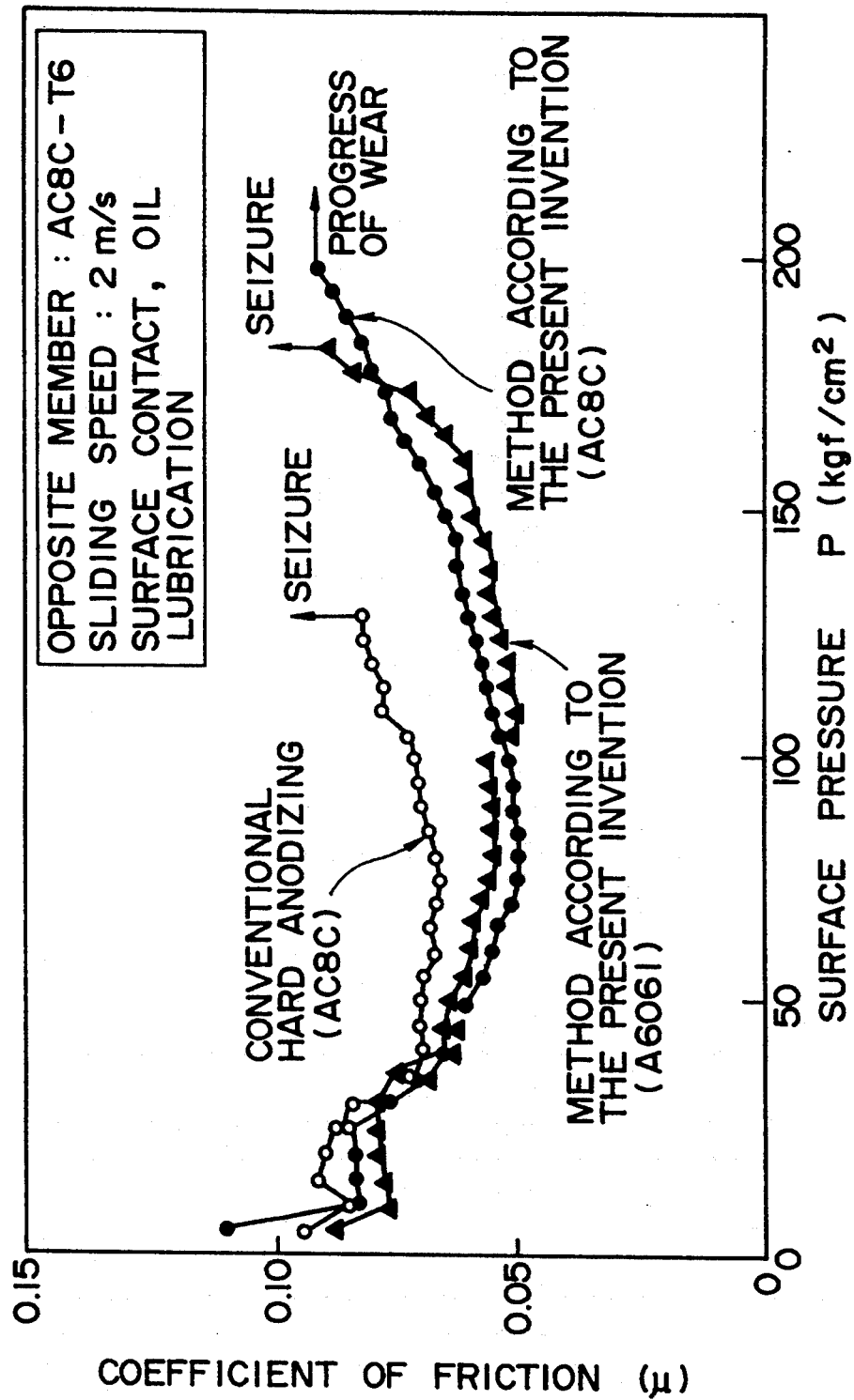

METHOD FOR MAKING A COMPOSITE ALUMINUM ARTICLE

This is a continuation of application Ser. No. 07/922,469, filed Jul. 30, 1992.

BACKGROUND OF THE INVENTION

1. Field of the Invention

This invention relates to a method for making a composite aluminum article. This invention particularly relates to a method for making a composite aluminum article, wherein the surface of an aluminum material or an aluminum alloy material is imparted with excellent lubricating properties.

2. Description of the Related Art

As a method for imparting lubricating properties to oxide films of aluminum alloy materials which films are formed by anodization, methods described below have already been proposed.

Specifically, it has been proposed to impregnate unsealed pores or unsealed cracks in an oxide film formed by an anodizing process with a lubricating oil.

However, the aluminum alloy material obtained from such a method has drawbacks in that, for example, it cannot be used in applications where a solvent is used.

It has also been proposed to use solid lubricants for the purpose of imparting the lubricating properties. For example, Japanese Unexamined Patent Publication No. 56(1981)-130489 discloses a method wherein an aluminum alloy material is immersed in a solution containing a metal oxyacid salt (tetrathiomolybdate), and then treated by anodic secondary electrolysis, so as to fill pores in the oxide film formed by anodization with a metal oxide (molybdenum disulfide). A method has also been proposed wherein an aluminum alloy material is immersed alternately in a metallic soap solution and an acid. A method has additionally been proposed wherein an aluminum alloy material is immersed alternately in a liquid containing a metal sulfide and in an acid. Further, a method has been proposed wherein electrolytic pores are filled with a metal soap or a metal sulfide.

However, the proposed methods have drawbacks in that the formed film exhibits a high coefficient of wear (0.2 to 0.3), poor durability, and insufficient self-lubricating properties. Actually, the proposed methods have not been put into practice for the purposes of imparting lubricating properties to sliding parts which requires good lubrication characteristics. This is presumably because the degree of wear of the anodic oxide film in itself is high.

Also, like a method typified by the method disclosed in Japanese Patent Publication No. 52(1977)-39059, a method has been known wherein pores of a hard anodic oxide film are impregnated with a polytetrafluoroethylene (hereinafter referred to as the "PTFE"). This is a composite film forming method utilizing the characteristics of a PTFE resin which exhibits a low coefficient of friction and water- and oil-repellent properties. Specifically, in this method, a hard anodic oxide film having a thickness ranging from 20 μm to 50 μm is formed and is then impregnated with PTFE to a depth of approximately 10 μm from the surface of the film.

It is said that the aforesaid method utilizing PTFE can result in excellent wear-resistant properties. However, it is doubtful that PTFE will penetrate into the pores of the hard anodic oxide film with certainty. Also, the adhesion of PTFE is not sufficient, and improvements are rather poor in the sliding characteristics of precision parts which requires high accuracy and of compressor parts which requires high air tightness. Additionally, sufficient resistances to abrasive wear and adhesive wear cannot be obtained. Thus there remain problems to be solved with regard to the use of this method for parts which have to have high overall durability.

As described above, the conventional method of treating a hard anodic oxide film for imparting the lubricating properties thereto exhibit only insufficient improvements in the sliding characteristics of precision parts which have to show high accuracy and of compressor parts which have to show high air tightness.

SUMMARY OF THE INVENTION

A primary object of the present invention is to provide a method for making a composite aluminum article, wherein fine polytetrafluoroethylene (PTFE) particles are uniformly adhered to the surface of a hard anodic oxide film of aluminum or of an aluminum alloy, so that a composite aluminum article exhibiting excellent frictional wear characteristics and excellent anti-seizure properties can be provided.

The present invention provides a method for making a composite aluminum article, which comprises the steps of electrochemically or chemically adsorbing and drying fine particles of a polytetrafluoroethylene to the surface of a hard anodic oxide film of aluminum or an aluminum alloy, and then rubbing the thus treated film with another member which slides on said film during actual use, so that a lubricous film is formed.

Specifically, in the method for making a composite aluminum article in accordance with the present invention, while a hard anodic oxide film is formed on aluminum or an aluminum alloy by an ordinary anodizing process, positive or negative electrical charges are given to fine PTFE particles, and the charged fine PTFE particles are dispersed uniformly in an aqueous solution. The aluminum or aluminum alloy which has the oxide film thereon is then immersed in the aqueous solution. In cases where positive electrical charges have been given to the fine PTFE particles, negative electrolysis occurs in the aqueous solution, and in cases where negative electrical charges have been given to the fine PTFE particles, the PTFE fine particles can be uniformly adsorbed with an electrochemical or chemical process on the surface of the hard anodic oxide film of aluminum of aluminum alloy by simple immersion. After drying, the surface and another member which slides along the surface of this anodic oxide film when these members are in actual use are rubbed together, so that a uniform PTFE film is formed on the surface of the hard anodic oxide film.

With the method of the present invention, the fine PTFE particles are adsorbed onto the surface of the hard anodic oxide film of aluminum or an aluminum alloy, and crushed by, for example, the assembling contact with the opposite member. Also, the crushed fine PTFE particles are extended into a thin film by the relative sliding motion of the two members with respect to each other, so that a lubricous film is formed.

Therefore, when the composite aluminum article obtained in accordance with the present invention and the opposite member are assembled together for user their contact surfaces slide along with each other (i.e. they are rubbed together), so that a lubricous film is formed and the lubricating properties are obtained.

Preferably, the composite aluminum article obtained in accordance with the present invention and the opposite member sliding along the composite aluminum article should form a pair of aluminum or aluminum alloy parts. The composite aluminum article obtained in accordance with the present invention having the lubricous film thereon and the opposite member slide with respect to each other.

Therefore, typical examples of the composite aluminum article obtained in accordance with the present invention and the opposite member sliding along the composite aluminum article would be a combination of a shaft and a bearing, a combination of a piston and a cylinder in a pump, a combination of a rotor and a plate in a rotary compressor, a combination of a fixed scroll and a rotary scroll in a scroll fluid machine, only to name a few.

The composite aluminum article obtained in accordance with the present invention has a hard anodic oxide film, and a uniform PTFE film layer is overlaid on the hard anodic oxide film. Unlike the conventional film forming process wherein the PTFE is molten at a high temperature ranging from 350° C. to 400° C., the PTFE film in the present invention is obtained from a film forming process wherein PTFE is dried at a low temperature ranging from 80° C. to 120° C. Therefore, there is no risk of degrading the strength characteristics of aluminum or an aluminum alloy. Also, only the necessary part can be imparted with the characteristics of PTFE, i.e., its low coefficient of friction and its excellent lubricating properties.

Specifically, with the method for making a composite aluminum article in accordance with the present invention, a composite aluminum article can be obtained which exhibits excellent frictional wear characteristics and excellent anti-seizure properties.

BRIEF DESCRIPTION OF THE DRAWING

FIG. 1 is a graph showing frictional wear characteristics and seizure behavior of an A6061 material and an AC8C material which have been treated with the method in accordance with the present invention.

DESCRIPTION OF THE PREFERRED EMBODIMENTS

The present invention will hereinbelow be described in further detail by the following nonlimitative examples.

First, the surface of aluminum or an aluminum alloy was uniformly cleaned by an ordinary degreasing treatment. Then, depending on the case, aluminum or the aluminum alloy was etched for 1 to 5 minutes with an aqueous solution containing 50 to 70 g/l of sodium hydroxide. In this manner, oxides and scratches were eliminated from the surface of the aluminum or aluminum alloy.

Subsequently, a desmutting treatment was carried out with a 20% to 30% aqueous solution of nitric acid. Electrolysis was then carried out at a low temperature and with constant current in an electrolytic solution containing 150 to 300 g/l of sulfuric acid, a mixed acid electrolytic solution containing a dibasic acid, such as sulfuric acid or oxalic acid, and an organic acid, or a mixed acid electrolytic solution containing an aromatic sulfonic acid and sulfuric acid. A hard anodic film was thus grown to a desired film thickness.

Then, with an emulsion polymerization process using a cationic active agent, positive electrical charges were given to fine PTFE particles which had a molecular weight of 400,000 to 4,000,000 and an average particle diameter of 0.1 μm to 0.5 μm. The electrically charged particles were dispersed in a solution using a nonionic active agent. The aluminum or aluminum alloy (hereinafter referred to as the treated material) on which the film was formed was immersed in this solution, and heated to a temperature ranging from 40° C. to 80° C. In this state, the treated material was taken as a negative electrode, the opposite electrode (a carbon electrode) was taken as a positive electrode, and a voltage of 2 V to 10 V was applied, so that the positively charged fine PTFE particles were electrochemically adsorbed onto the hard anodic oxide film to form a uniform monomolecular layer Also, using an anionic active agent negative electrical charges were given to fine PTFE particles of the same type as that described above. The resulting electrically charged particles were uniformly dispersed in an aqueous solution.

This aqueous solution was then heated to a temperature ranging from 40° C. to 80° C., and the treated material, which had the hard anodic oxide film and which was positively charged in a zeta-potential mode, was immersed in the aqueous solution. In this manner, the fine PTFE particles were adsorbed in the form of a uniform monomolecular layer to the surface of the hard anodic oxide film.

In each case, the treated material was dried at a low temperature ranging from room temperature to 100° C. The treated material and the opposite member, which would slide along the treated material when assembled, were rubbed together, so that the fine PTFE particles, which had been adsorbed to the surface of the anodic oxide film, were converted into a thin film.

The highly lubricous, hard anodized material, which was treated in the manner described above, exhibited excellent lubricating properties, excellent anti-seizure properties, excellent sealing properties, and excellent sound absorbing qualities.

FIG. 1 shows frictional wear characteristics and seizure behavior of an A6061 material and an AC8C material, which have been treated by the methods described above (i.e., with embodiment methods in accordance with the present invention).

For comparison, the frictional wear characteristics and seizure behavior of an AC8C and A6061 material which have been treated with the conventional hard anodizing process (the process described in Japanese Patent Publication No. 52(1977)-39059) are also shown in FIG. 1.

The frictional wear characteristics shown in FIG. 1 were determined with a frictional wear tester of oil-lubricated, pin-on-disk type.

The following can be seen from the results of the determination shown in FIG. 1.

Specifically, materials treated only with the anodizing process exhibited a high coefficient of friction from the early stage, and suffered from seizure with the opposite member (pin: AC8C-T6 material) while sliding at a low load along the treated material. On the other hand, the composite aluminum article obtained with the method in accordance with the present invention exhibited a low coefficient of friction, and showed the seizure load with respect to the opposite member (pin: AC8C-T6 material) which was several times higher than the material treated only for a hard anodic oxide film. It was thus revealed that, with the method in accordance with the present invention, the frictional wear characteristics and the anti-seizure properties of the aluminum material can be markedly improved.

We claim:

1. A method for making a composite aluminum article, comprising the steps of:
    electrochemically or chemically adsorbing fine particles of polytetrafluoroethylene to a surface of a hard anodic oxide film of a material chosen from the group consisting of aluminum and an aluminum alloy, said oxide film being disposed on an article;
    drying said treated article; and
    subsequently rubbing together said article and an opposite member which is to slide along said article, so as to form a lubricating film of said polytetrafluoroethylene, wherein said adsorbing step includes providing positive electrical charges to said fine particles of polytetrafluoroethylene, dispersing said fine particles of polytetrafluoroethylene uniformly in an aqueous solution, immersing said article having said hard anodic oxide film in said aqueous solution and electrolysis is carried out in said aqueous solution, whereby said fine particles of said polytetrafluoroethylene are adsorbed onto the surface of said hard anodic oxide film, wherein said particles of polytetrafluoroethylene have an average particle diameter of 0.1 $\mu$m to 0.5 $\mu$m.

2. A method as defined in claim 1, wherein prior to said adsorbing step, said method includes the additional step of degreasing said article.

3. A method as defined in claim 1, wherein prior to said adsorbing step, said method includes the additional step of desmutting said article.

4. A method as defined in claim 1, wherein prior to said adsorbing step, said method includes the additional step of anodizing said material to form a hard anodic oxide film on a surface of said article.

5. A method as defined in claim 1, wherein said aqueous solution comprises a nonionic active agent heated to within the range of from 40° C. to 80° C.

6. A method as defined in claim 1, wherein said aqueous solution comprises an anionic active agent heated to within the range of from 40° C. to 80° C.

7. A method as defined in claim 6, wherein prior to said step of immersing said article in said aqueous solution, said article is positively charged in a zeta-potential mode.

8. A method as defined in claim 1, wherein said rubbing step provides a monoparticle thickness film of said polytetrafluoroethylene.

9. A method for making a composite aluminum article, comprising the steps of:
    electrochemically or chemically adsorbing fine particles of polytetrafluoroethylene to a surface of a hard anodic oxide film of a material chosen from the group consisting of aluminum and an aluminum alloy, said oxide film being disposed on an article;
    drying said treated article; and
    subsequently rubbing together said article and an opposite member which is to slide along said article, so as to form a lubricating film of said polytetrafluoroethylene wherein said adsorbing step includes providing negative electrical charges to said fine particles of polytetrafluoroethylene, dispersing said fine particles of said polytetrafluoroethylene uniformly in an aqueous solution, and immersing said article having said hard anodic oxide film in said aqueous solution, whereby said fine particles of polytetrafluoroethylene are adsorbed to the surface of said hard anodic oxide film, wherein said particles of polytetrafluoroethylene have an average particle diameter of 0.1 $\mu$m to 0.5 $\mu$m.

10. A method as defined in claim 9, wherein prior to said adsorbing step, said method includes the additional step of degreasing said article.

11. A method as defined in claim 9, wherein prior to said adsorbing step, said method includes the additional step of desmutting said article.

12. A method as defined in claim 9, wherein prior to said adsorbing step, said method includes the additional step of anodizing said material to form a hard anodic oxide film on a surface of said article.

13. A method as defined in claim 9, wherein said aqueous solution comprises a nonionic active agent heated to within the range of from 40° C. to 80° C.

14. A method as defined in claim 9, wherein said aqueous solution comprises an anionic active agent heated to within the range of from 40° C. to 80° C.

15. A method as defined in claim 14, wherein prior to said step of immersing said article in said aqueous solution, said article is positively charged in a zeta-potential mode.

16. A method as defined in claim 9, wherein said rubbing step provides a monoparticle thickness film of said polytetrafluoroethylene.

* * * * *